United States Patent [19]
Apel

[11] Patent Number: 5,991,378
[45] Date of Patent: *Nov. 23, 1999

[54] DYNAMIC CHARGING FOR TELECOMMUNICATIONS SERVICES IN ACCORDANCE WITH THE LOAD CONDITION OF THE NETWORK

[75] Inventor: Ulrich Apel, Ditzingen, Germany

[73] Assignee: Alcatel, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 08/910,180

[22] Filed: Aug. 13, 1997

[30] Foreign Application Priority Data

Aug. 28, 1996 [DE] Germany ............................ 196 34 664

[51] Int. Cl.[6] .................................................. H04M 15/00
[52] U.S. Cl. ........................... 379/114; 379/121; 455/406
[58] Field of Search ..................... 379/114, 115, 379/119, 120, 121, 130, 111, 112, 116; 455/406, 407, 408

[56] References Cited

U.S. PATENT DOCUMENTS

| | | | |
|---|---|---|---|
| 5,488,655 | 1/1996 | Hamlen | 379/114 |
| 5,790,642 | 8/1998 | Taylor et al. | 379/115 |
| 5,793,852 | 8/1998 | Kang et al. | 379/115 |
| 5,794,140 | 8/1998 | Sawyer | 455/408 |

FOREIGN PATENT DOCUMENTS

| | | |
|---|---|---|
| 0491497 | 6/1992 | European Pat. Off. . |
| 0526118 | 2/1993 | European Pat. Off. . |
| 3305978 | 8/1984 | Germany . |
| 4219416 | 12/1993 | Germany . |
| 4241434 | 6/1994 | Germany . |
| 19516364 | 11/1995 | Germany . |
| 0685971 | 3/1994 | Japan . |
| 9308661 | 4/1993 | WIPO . |
| 9428683 | 12/1994 | WIPO . |
| 9524093 | 9/1995 | WIPO . |

OTHER PUBLICATIONS

"Alcatel worldwide Intelligent Networks—an overview of supplied systems and services" by Roscam et al in Alcatel Telecommunications Review, 1st Quarter 1996, pp. 68–78.
"Intelligent Networks and Multimedia" by Van Ackere et al in Alcatel Telecommunications Review, 1st Quarter 1996, pp. 53–61.

*Primary Examiner*—Paul Loomis
*Attorney, Agent, or Firm*—Ware, Fressola, Van Der Sluys & Adolphson LLP

[57] ABSTRACT

Method and system for setting a charge in a telecommunication network The present invention relates to a method and a system (TZ) for setting a charge for a communication service in a telecommunication network (T). It is proposed to dynamically change the charge in accordance with a presettable criterion. It is further proposed that the traffic load of the telecommunication network T preferably represents such a presettable criterion.

10 Claims, 1 Drawing Sheet

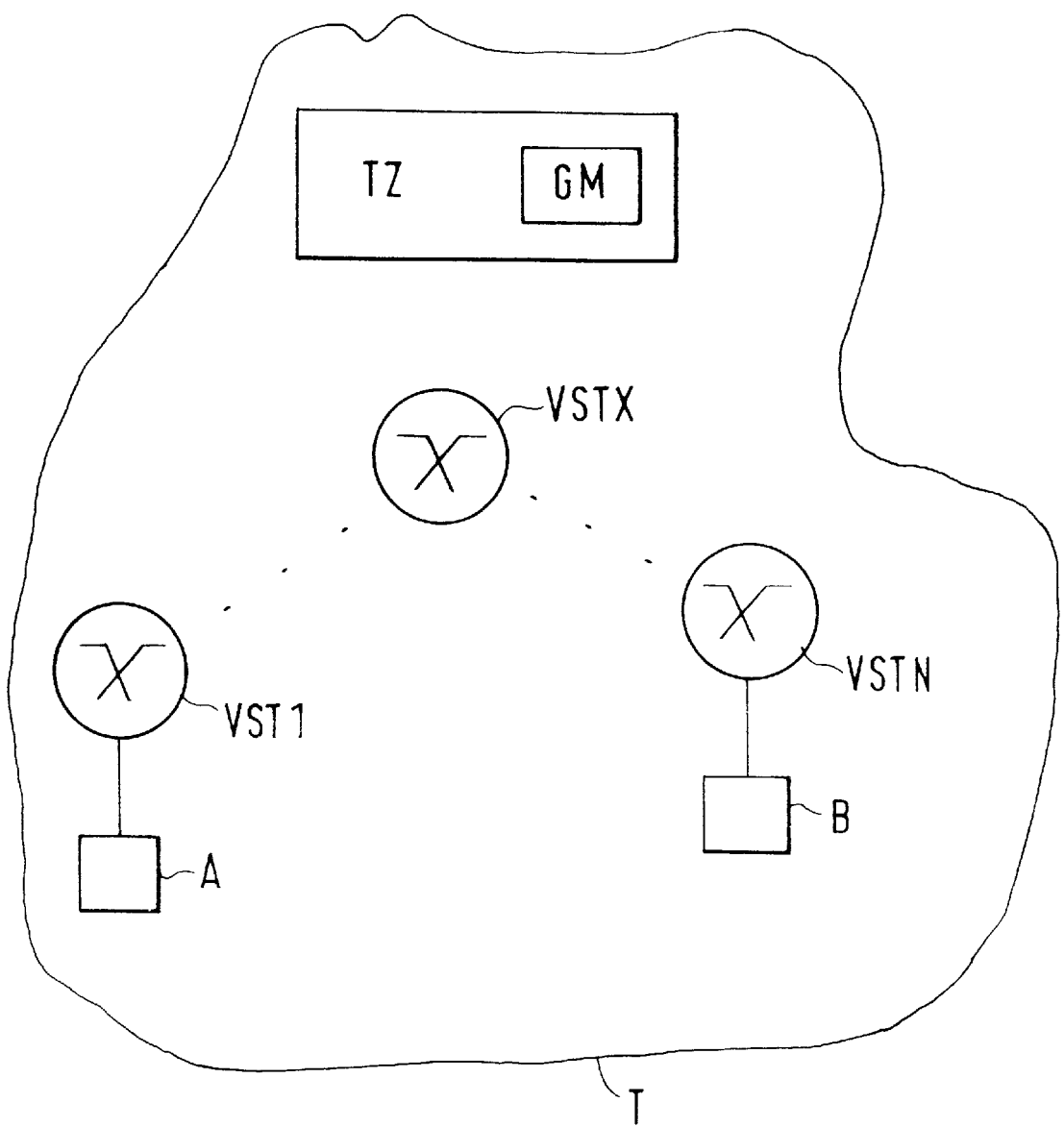

DYNAMIC CHARGING FOR TELECOMMUNICATIONS SERVICES IN ACCORDANCE WITH THE LOAD CONDITION OF THE NETWORK

TECHNICAL FIELD

The present invention relates to a method for setting a charge in a telecommunication network wherein the charge for using the telecommunication service is set dynamically in accordance with at least one criterion of the network and wherein the communication service is used by a subscriber dependent on at least one charge limit preset by a subscriber and on the charges set dynamically for using the communication service. It is also directed to a system for setting a charge for using a communication service in a telecommunication network, the system comprising means for having the charge for using the communication service set dynamically by the network in accordance with at least one presettable criterion and means for offering a selection of differently configured communication services.

BACKGROUND OF THE INVENTION

It is known that charges for using communication services are assessed by way of static tariffs. With a static tariff, the charges for using the communication service are set in advance by the operating company of the communication service.

An example for a static tariff of this type is the charging method which is customary in telecommunication networks when a connection is set up from a first to a second subscriber, wherein the charge depends on the duration of the established call and of the distance between the two subscribers.

Another example for a static tariff is the charging method employed particularly in telecommunication networks using an asynchronous transmission mode wherein the charge depends on the amount of information transmitted between the first and the second subscriber.

SUMMARY OF THE INVENTION

It is the object of the present invention to set a charge for using a communication service in a telecommunication network, so that a uniform traffic load of the network is enabled.

This object is solved by a method for setting the charge for using a communication service in a telecommunication network, wherein the charge for using the telecommunication service is set dynamically in accordance with at least one criterion of the network and wherein the communication service is used by a subscriber dependent on at least one charge limit preset by a subscriber and on the charges set dynamically for using the communication service, wherein the subscriber, dependent on the charge limit preset by the subscriber for using the communication service, is offered a selection of several differently configured communication services.

It is also solved by a system for setting a charge for using a communication service in a telecommunication network, the system comprising means for having the charge for using the communication service set dynamically by the network in accordance with at least one presettable criterion and means for offering a selection of differently configured communication services, wherein the means for having the charge for using the communication service set are constructed in such a way as to offer the selection of differently configured communication services dependent on a charge limit set by the subscriber.

Herein, a user is offered a selection of several differently configured communication services dependent on the charge limit preset by the user.

BRIEF DESCRIPTION OF THE DRAWING

In the following, the invention and its advantages are explained in detail with reference to an embodiment and the drawing. It is shown in:

the FIGURE an example of a telecommunication network adapted for execution of the method of the invention, with an embodiment of a system of the invention.

BEST MODE FOR CARRYING OUT THE INVENTION

In the FIGURE, there is illustrated a telecommunication network T comprising a plurality of exchanges, with the exchanges VST1, . . . , VSTX, . . . , VSTN shown in the FIGURE. The exchanges are connected to each other, either directly or indirectly, through transmission devices (not shown). Subscribers can be connected to the exchanges. In the present example, a subscriber A is connected to the exchange VST1 and a subscriber B is connected to the exchange VSTN. The telecommunication network T further comprises a central control unit TZ. In the present example, the exchanges VST1, . . . , VSTX, . . . , VSTN transmit to the central control unit TZ predetermined information for recording and evaluation, in particular for statistical purposes. Such predetermined information is, in particular, information relating to the traffic load of the telecommunication network T.

In the present example, the central control unit TZ comprises a charge setting means GM for setting the charge for using a communication services in accordance with a presettable criterion. Such a presettable criterion can be, for example, the traffic load of the telecommunication network T or a campaign by the operating company or by another organization advertising a reduced rate. The communication service can be any service capable of operating within the telecommunication network T or a feature, such as setting up a connection from a first to a second subscriber, a call transfer from a first to a second subscriber or a conference call between several subscribers.

The central control unit TZ with the charge setting means GM is advantageous, but not essential, for implementing the present invention. It is possible to control the functions within the telecommunication network T and to set the charge for using the communication service exclusively through signaling between the individual exchanges VST1, . . . , VSTX, . . . , VSTN of the telecommunication network T. In this case, the central control unit TZ can be eliminated. The function of the central control unit TZ can then be executed in a decentralized fashion in the respective exchanges of the telecommunication network T.

In the present example, a connection from the subscriber A to the subscriber B is set up as a communication service. For this purpose, resources are occupied in the telecommunication network T. This presents an additional traffic load for the telecommunication network T. In the present case, the predetermined criterion for setting the charge for using the communication service is the traffic load of the telecommunication network T. A first information relating to the traffic load of the telecommunication network T is determined by the central control unit TZ based on the information relating to the traffic load of the telecommunication network T which is transmitted to the central control unit TZ by the exchanges VST1, ..., VSTX, ..., VSTN. The traffic load of the telecommunication network T is preferably determined according to a defined timing pulse, whereby the information relating to the traffic load of the telecommunication network T is updated regularly. For connecting the subscriber A to the subscriber B, a channel is switched through the telecommunication network T. The resources of the telecommunication network T which have to be occupied for this purpose, are known to the central control unit TZ. This additional traffic load of the telecommunication network T resulting from the utilization of the communication service by the subscriber A is subsequently referred to as second information. The charge setting means GM subsequently set the charge for using the communication service depending on the first and second information. Preferably, this charge is made accessible to the subscriber. This feature can, for example, be implemented by allowing the subscriber A to recall this charge on-line from the central control unit TZ or from another server (not shown) or by automatically transmitting the charge for using the communication service to the terminal of the subscriber A and displaying the charge on the terminal. The operating company of the communication service can set a minimum and/or maximum charge for the use thereof.

With the above method, it is possible to introduce a dynamic rule of supply and demand into the process used by communication services for establishing charges. The term dynamic shall be understood in that the charge for using the communication service is not set a priori, but is allowed to change dependent on a presettable criterion, for example the traffic load of the telecommunication network T.

It is possible that the charge for using the communication service remains unchanged during the entire use of the communication service. It is, however, also possible to change the charge dynamically during the time when the communication service is utilized.

Advantageously, the subscriber A can also preset a maximum charge limit for the use of the communication service. Consequently, the subscriber A will use the communication service only when the actual charge for using the communication service does not exceed this charge limit. For example, the subscriber A could decide that a connection to the subscriber B residing overseas should only be set up if the charge for this connection is less than a preset amount.

Furthermore, the subscriber A who has predefined a charge limit for using the communication service, could be offered a selection of differently configured communication services. For example, a connection to the subscriber B could be established as a pure voice channel when the telecommunication network T experiences a high load, and as a combination of a voice and a video channel when the telecommunication network T experiences a low load. The subscriber A is then advantageously able to utilize additional communication services at low cost during times when the traffic load of the telecommunication network T is low.

What is claimed is:

1. A method for setting the charge for using a communication service in a telecommunication network (T), wherein the charge for using the communication service is set dynamically by the network in accordance with at least one criterion of the network and wherein the communication service is used by a subscriber (A) dependent on at least one charge limit preset by the subscriber (A) and on the charges set dynamically for using communication service, characterized in that subscriber (A) is offered a selection of several communication services differently configured for the subscriber (A) in accordance with the charge limit preset by the subscriber (A).

2. A method according to claim 1, characterized in that a presettable criterion is the traffic load of the telecommunication network (T).

3. A method according to claim 2, characterized in that there is defined a timing pulse which is used for regularly updating the information relating to the traffic load of the telecommunication network (T), that a first information relating to the traffic load of the telecommunication network (T) is determined, that a second information relating to the additional traffic load of the telecommunication network (T) caused by the proposed use of the communication service is determined, and that the charge for using the communication service is set dependent on the first and second information.

4. A method according to claim 3, characterized in that an information relating to the charge for using the communication service is made available to a subscriber (A) who intends to use the communication service.

5. A method according to claim 4, characterized in that a minimum and/or maximum charge is set for using the communication service.

6. A method according to claim 5, characterized in that the charge for using the communication service is also changed during the time period when the subscriber (A) uses the communication service.

7. A method according to claim 1, characterized in that an information relating to the charge for using the communication service is made available to a subscriber (A) who intends to use the communication service.

8. A method according to claim 1, characterized in that a minimum and/or maximum charge is set for using the communication service.

9. A method according to claim 1, characterized in that the charge for using the communication service is also changed during the time period when the subscriber (A) uses the communication service.

10. A system (TZ) for setting a charge to a subscriber (A) for using a communication service in a telecommunication network (T), the system comprising means (GM) for having the charge for using the communication service set dynamically by the network in accordance with at least one presetable criterion and means for offering a selection of differently configured communication services, characterized in that means for having the charge for using the communication service set (GM) are constructed in such a way as to offer the selection of communication services configured differently for subscriber in accordance with a charge limit preset by the subscriber (A).

\* \* \* \* \*